United States Patent [19]
Sollee

[11] Patent Number: 6,101,380
[45] Date of Patent: Aug. 8, 2000

[54] METHOD OF RE-USING AUTHENTICATION TRIPLETS ON INTER-VLR LOCATION UPDATES

[75] Inventor: Patrick Sollee, Richardson, Tex.

[73] Assignee: Nortel Networks Limited, Montreal, Canada

[21] Appl. No.: 08/969,878

[22] Filed: Nov. 14, 1997

[51] Int. Cl.[7] .................................................. H04Q 7/22
[52] U.S. Cl. ........................ 455/411; 455/433; 380/248
[58] Field of Search .................... 455/410, 411, 455/432, 433, 560; 380/21, 23, 247–248, 271

[56] References Cited

U.S. PATENT DOCUMENTS

| | | | |
|---|---|---|---|
| 5,329,573 | 7/1994 | Chang et al. | 455/411 |
| 5,390,234 | 2/1995 | Bar-Noy et al. | 455/435 |
| 5,668,875 | 9/1997 | Brown et al. | 380/23 |
| 5,670,950 | 9/1997 | Otsuka | 455/411 |
| 5,781,863 | 7/1998 | Bales et al. | 455/456 |
| 5,887,251 | 3/1999 | Fehnel | 455/411 |
| 5,893,031 | 4/1999 | Hoogerwerf et al. | 455/410 |

*Primary Examiner*—William G. Trost
*Attorney, Agent, or Firm*—John D. Crane

[57] ABSTRACT

A method of re-using authentication triplets on inter-VLR location updates in a wireless communication network. The method reduces the amount of work on the MSC and HLR, and thus significantly increases the capacity of a high mobility MSC and the HLR to increase the number of mobile subscribers each node in the wireless communication network can support. The number of times the MSC must request new authentication triplets from the HLR, and thus the number of authentication triplets the HLR must return, is reduced to increase the capacity on the MSC and HLR, particularly in a GSM network.

4 Claims, 2 Drawing Sheets

METHOD OF RE-USING AUTHENTICATION TRIPLETS ON INTER-VLR LOCATION UPDATES

FIELD OF THE INVENTION

The present invention relates generally to wireless communications systems, and more particularly, to a method of performing authentication of a mobile station to ensure that a mobile station is a valid user.

BACKGROUND OF THE INVENTION

As the number of cellular subscribers in a metropolitan area increase, the number of switching nodes in the area increase. The work that the wireless communications network must do to track the movement of mobile subscribers between switching nodes is more than the work required to track subscriber movement within one single switching node. In a GSM network for example, part of the work that must be done when a mobile subscriber moves to a new switching node is Authentication. Authentication is the process by which a mobile switching center (MSC) ensures that the mobile subscriber is really a valid user. In order to authenticate the mobile subscriber, a set of authentication triplets is required from a home location register HLR. Conventionally, the MSC uses one of these sets of authentication triplets each time the mobile subscriber is authenticated, and then throws away this triplet (GSM specification recommendation).

Referring to FIG. 1, there is shown a conventional wireless communication system 10, which may be a GSM, TDMA, CDMA etc. technology. The gateway MSC12 communicates calls between a public switched communication network (PSTN) 14 and a plurality of base switching center (BSCs) 16. The BSCs 16 in turn, service the mobile subscribers (MSs) 18 via RF radio signals. Each MSC 12 has a visitors location register (VLR) 22 for storing currently served MS 18 information. The amount of work the MSC 12 spends on requesting authentication triplets from the home location register of the serviced mobile subscribers (HLR) 20 is significant. Moreover, the amount of work the HLR 20 spends generating these authentication triplets is higher than the work done by the MSC 12. As the rate of the mobile subscriber moving between switching nodes increases i.e. BSC to BSC for a different MSC, which is commonly referred to as inter-VLR location update, the amount of Authentication increases. This may result in more Authentication occurring in the network 10 than the cellular service provider intends. This increase in Authentication causes a decrease in the number of mobile subscribers 18 that each node (MSC 12) in the network can support since extra work (i.e. extra CPU processing) must be done for Authentication.

In the past, to increase the capacity of the MSC 12, many different mechanisms have been used. These include hardware upgrades to faster processors, software optimizations, and the reduction of the amount of work required to be done by the MSC 12 e.g. by reducing messaging for inter-VLR location updates such as disclosed in commonly assigned U.S. patent application Ser. No. 08/864,927, entitled "Distributed Subscriber Data Management in Wireless Network" filed May 29, 1997, and U.S. patent application Ser. No. 08/864,926, entitled "Distributed Subscriber Data Management in Wireless Networks from a Central Perspective" filed May 29, 1997, the teachings of which are included herein by reference.

Authentication can occur on the following events: call originations, call terminations, inter-VLR location updates, intra-VLR location updates, and periodic location updates. The frequency of authentication is specified via an operator controlled parameter (except for inter-VLR location updates, which must always be authenticated). Presently, the MSC/VLR can store N authentication triples per mobile subscriber. One triplet is used each time an authentication event occurs. The triplet that was last used to authenticate the subscriber is marked as the "current triplet".

When an authentication event has been completed, the MSC/VLR currently serving the mobile subscriber checks to see how many triplets are left for that subscriber. If there are X number of triplets left, the MSC requests more triplets from the subscribers HLR. The HLR then generates up to 5 triplets and sends them to the MSC.

Currently, the rate that authentication triplets are requested from the HLR is in direct proportion to the number of events that are occurring on the MSC. The rate is especially sensitive to the number of inter-VLR location updates that are occurring which especially high for a High Mobility MSC that serves a metropolitan area. The relationship between events and Authentication triplet requests is graphed in FIG. 2. The lines represent the ratio of Events to Triplet Requests for a Low Mobility MSC and a High Mobility MSC.

There is a desire for an improved method to reduce the number of requests to the HLR for Authentication triplets in a wireless communications network to achieve a capacity increase on the MSC and a capacity increase on the HLR. This increases the number of subscribers that may be supported by each MSC.

SUMMARY OF THE INVENTION

The present invention achieves technical advantages by re-using the Authentication triplet on an inter VLR location update that was used when the mobile subscriber was last authenticated at the current MSC to reduce the amount of work the network must perform for Authentication. This reduces the number of times each MSC in the network must request new authentication triplets from the HLR and, of course, the number of authentication triplets the mobile subscriber's HLR must return, which results in an increase in the number of mobile subscribers the network can support.

The subscriber's authentication triplets are preferably kept at each VLR of the serving MSC, and the serving MSC keeps track of the authentication triplet that was used the last time authentication was performed at that MSC, which is marked as the "current triplet". Since this triplet will NOT be the same triplet that the subscriber was last authenticated with, re-using that triplet to authenticate the subscriber is possible. According to the present invention, the MSC will not have to request triplets from the HLR as frequently as before, since an inter-VLR location update does not require the use of a new triplet.

Not only is this a capacity improvement on the HLR and MSC, but it also allows an operating company greater control over the number of authentication triplets that must be requested from the HLR.

DESCRIPTION OF THE PREFERRED EMBODIMENT

Figure 1:
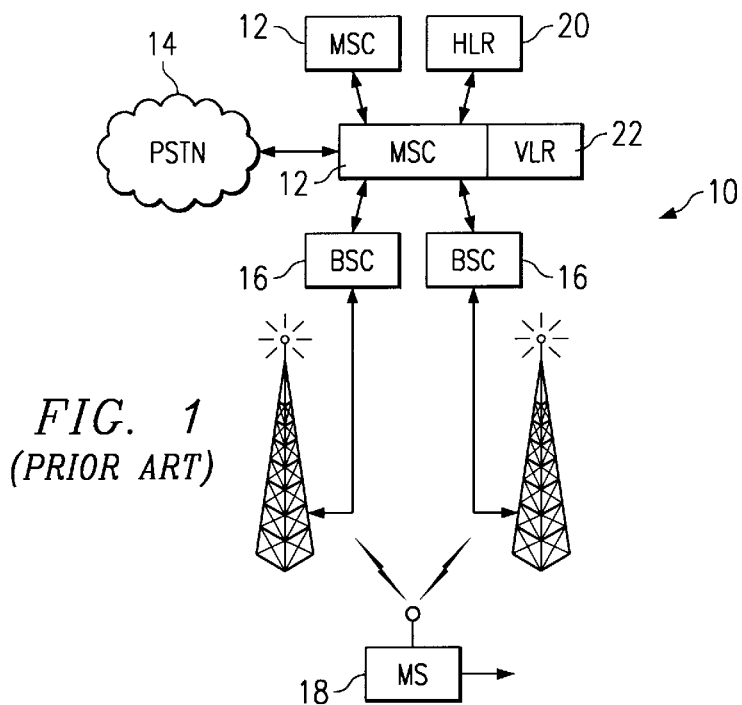
FIG. 1 is a block diagram of a conventional wireless communications network.
Figure 2:
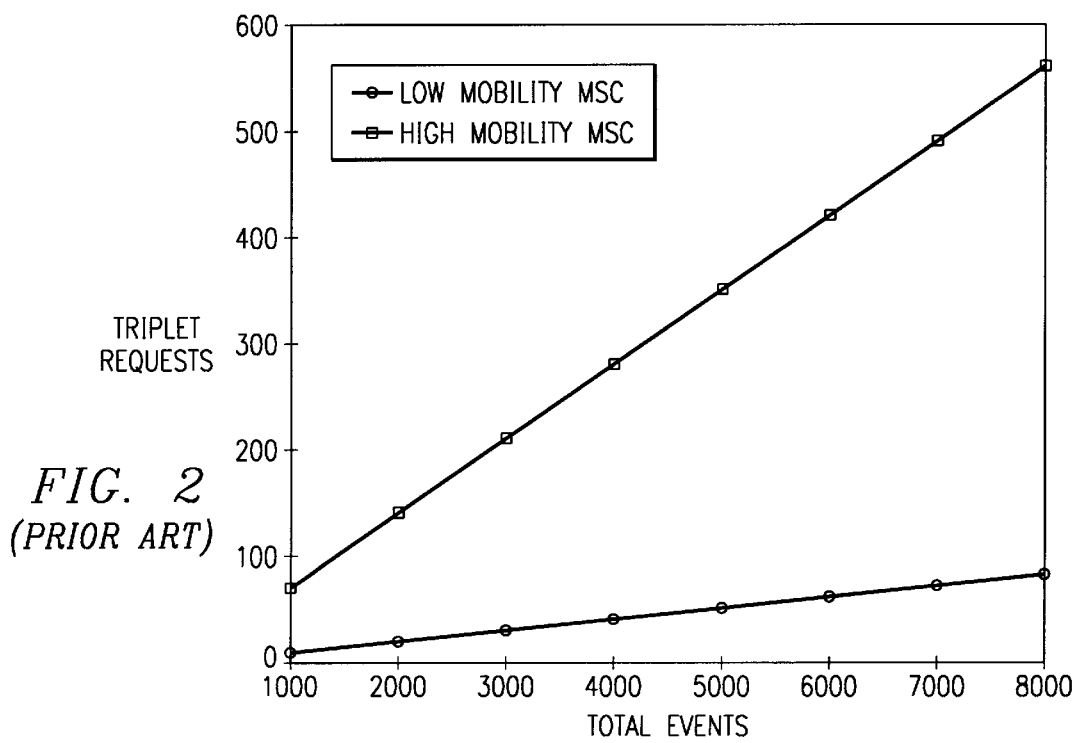
FIG. 2 is a graph illustrating the relationship between events and authentication triplet requests in conventional wireless communication systems.
Figure 3:
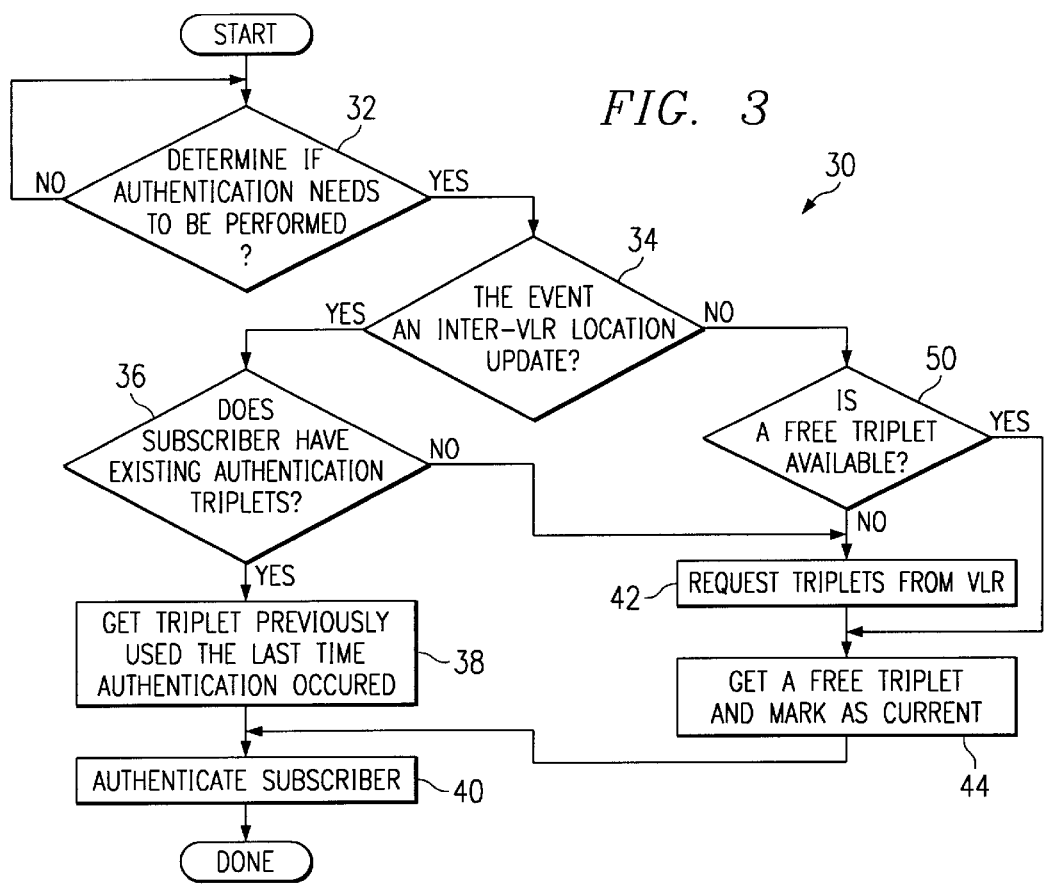
FIG. 3 is a flow diagram of a method for performing authentication according to the present invention by re-using authentication triplets during inter-VLR location updates.

Referring now to FIG. 3, there is illustrated generally at 30 an algorithm for performing authentication of a mobile subscriber 18 in wireless communication network 10 such as that of FIG. 1 according to the present invention. The algorithm 30 of the present invention substantially reduces the number of triplet requests by the mobile switching center (MSC) 12 and particularly a high mobility MSC, by re-using a current authentication triplet during inter-VLR (Visitor Location Register) location updates. The present invention substantially reduces the messaging in the mobile communication network 10 and therefore increases the capacity of both the MSC 12 and the Home Location Register (HLR) 20. The present invention provides that subscriber's authentication triplets are kept in multiple MSC's and are not deleted when a mobile subscriber leaves that MSC area, such as described in common assigned U.S. patent application Ser. No. 08/864,927, entitled "Distributed Subscriber Data Management in Wireless Network" filed May 29, 1997, and U.S. patent application Ser. No. 08/864,926, entitled "Distributed Subscriber Data Management in Wireless Networks from a Central Perspective" filed May 29, 1997, the teachings of which are included herein by reference.

Referring to FIG. 3, at step 32, the MSC 12 currently serving a particular mobile subscriber 18 determines if authentication needs to be performed for that MS 18 due to an event such as call origination, call termination, inter-VLR location update, intra-VLR location update, and periodic location update. If it is determined by the MSC currently serving the mobile subscriber that an authentication of the mobile subscriber 18 needs to be performed at step 32, the MSC at step 34 determines if the event necessitating the authentication is an inter-VLR location update event, that is, if the mobile subscriber 18 is to be served by a new BSC 16 served by a different MSC 12. If the answer is yes, the present MSC 12 now serving the subscriber next determines if the mobile subscriber 18 has an existing authentication triplet at step 36. If the answer is yes, at step 38 the MSC will re-use the authentication triplet that was used the last time authentication was performed at that MSC now serving the mobile subscriber, which is designated the "current triplet". Since this current triplet is not the same triplet that the presently authenticating subscriber was last authenticated with, re-using this current triplet to authenticate the present mobile subscriber 18 is possible. According to the present invention, the MSC of the network 18 will not have to request triplets from the HLRs of the MSC 18 as frequently as before, since the inter-VLR location update does not require the use of a new triplet.

Next, at step 40, the MSC authenticates the mobile subscriber 18 by providing a random number, which is part of the authentication triplet, to the mobile subscriber. The mobile subscriber then returns a result of running that random number through an equation stored at the mobile subscriber. The MSC then verifies that the result equals what is expected.

If at step 36 the subscriber is not determined to have an existing authentication triplet, the algorithm proceeds to step 42 whereby the MSC requests an additional set of triplets from the HLR 20 for that subscriber 18. Next, at step 44, the MSC 12 obtains one of the free triplets from that subscriber and marks this triplet as the "current triplet". The algorithm then proceeds to step 40 and authenticates the subscriber based on this current triplet.

Referring back to step 34, if the MSC 12 determines that the event necessitating the authentication is not an inter-VLR location update, the algorithm proceeds to step 50 and determines if a free triplet is available at the subscriber. If the answer is yes, the algorithm proceeds to step 44 to obtain a free triplet and to marks this triplet as the "current triplet" as described earlier. If a triplet is not determined to be free at step 50, the algorithm proceeds to step 42 to request a set of triplets from the HLR 20 and then proceeds to step 44 as described earlier.

It is noted that authentication must always be performed on inter-VLR location updates since a Cipher Key (Kc) and the Cipher Key Sequence Number (CKSN) are updated in the mobile station 18 during authentication. When the wireless communication network 10 attempts to cipher the connection with the mobile subscriber 18, the network 10 must use the same Kc that the mobile subscriber 18 is using, otherwise ciphering will fail. The Kc the network uses is part of the current Authentication Triplet that is received from the HLR 20. This Kc is used to cipher every transaction with the mobile subscriber 18 until the mobile subscriber is authenticated again. Generally, ciphering is done more than authenticating, so the Kc is used more than once. Also, the mobile subscriber includes the CKSN when accessing the network e.g. during a page response or CM Service Request. If the CKSN the mobile sends does not match the one stored by the VLR 22, the mobile is authenticated.

Figure 4:
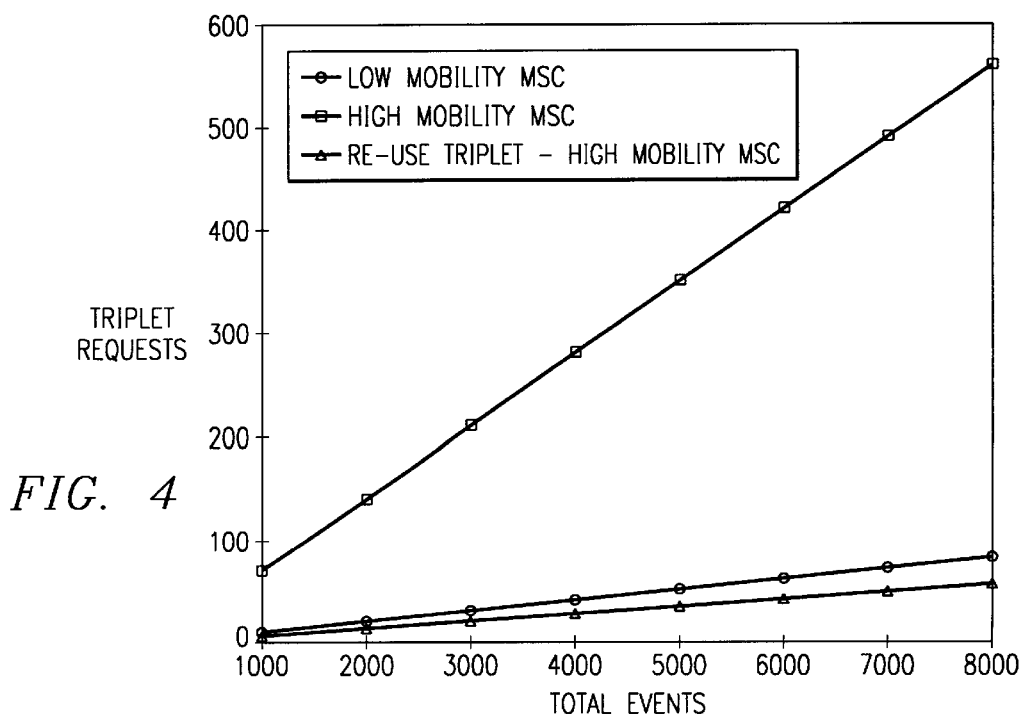
FIG. 4 is a graph plotting events versus authentication triplets requests when re-using authentication triplets during inter-VLR location updates according to the present invention for a high mobility MSC.

Referring now to FIG. 4, there is graphed the number of triplet requests in relation to total events of a high mobility MSC when the current authentication triplet is re-used on inter-VLR location updates according to the present invention. It can be seen that compared to the number of triplet requests performed in conventional systems, for example, if a total of 6,000 events are occurring on a high mobility MSC, 420 requests for triplets to the HLR must be made according to conventional prior art techniques. With the present invention, it is estimated that only 42 triple requests will have to be made, which is a 10× improvement over the prior art. The present invention significantly reduces the number of messages in a network to increase the capacity of both the MSCs and the HLRs. With regards to graph 4, the following assumptions are made:

for inter-VLR location updates, the subscribers data is already in the VLR the HLR returns 5 authentication triplets per triplet request the authentication rate desired is 5% (5% of events are authenticated)

in the high mobility MSCs 30% of all events are inter-VLR location updates.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A method of performing Authentication of a mobile subscriber necessitated by an event in a wireless communication system having network access elements using authentication triplets, comprising the steps of:

a) determining if the event necessitating Authentication of the mobile subscriber is an inter-VLR update; and b) re-using an authentication triplet last used by the current network access element of the wireless communication system serving the subscriber to authenticate the subscriber when the event is determined to be an inter-VLR update.

2. The method as specified in claim 1 wherein said wireless communication system includes a MSC as the network access element, a VLR and an HLR, wherein the current network access element of the wireless communication system is a current MSC.

3. The method as specified in claim 2 further comprising the step of the MSC requesting a new authentication triplet from the HLR to perform authentication when the event is not determined to be an inter-VLR update and the subscriber does not have a free triplet available.

4. The method as specified in claim 2 wherein the MSC determines if the event is an inter-VLR update.

\* \* \* \* \*